US010877992B2

(12) United States Patent
Mehler et al.

(10) Patent No.: US 10,877,992 B2
(45) Date of Patent: Dec. 29, 2020

(54) UPDATING A DATABASE

(71) Applicant: INTERNATIONAL BUSINESS MACHINES CORPORATION, Armonk, NY (US)

(72) Inventors: Jens Mehler, Schoenaich (DE); Florian Merkert, Stuttgart (DE); Carsten Otte, Stuttgart (DE); Stefan Usenbinz, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 15/826,867

(22) Filed: Nov. 30, 2017

(65) Prior Publication Data
US 2019/0163800 A1    May 30, 2019

(51) Int. Cl.
| G06F 16/27 | (2019.01) |
| G06F 16/21 | (2019.01) |
| G06F 16/23 | (2019.01) |
| G06F 16/28 | (2019.01) |

(52) U.S. Cl.
CPC .............. G06F 16/27 (2019.01); G06F 16/21 (2019.01); G06F 16/2365 (2019.01); G06F 16/283 (2019.01)

(58) Field of Classification Search
CPC ...................................... G06F 16/27
USPC ........................................ 707/695
See application file for complete search history.

(56) References Cited

U.S. PATENT DOCUMENTS

| 4,809,168 A | 2/1989 | Hennessy et al. |
| 5,442,758 A | 8/1995 | Slingwine et al. |
| 5,608,893 A | 3/1997 | Slingwine et al. |
| 5,727,209 A | 3/1998 | Slingwine et al. |
| 6,219,690 B1 | 4/2001 | Slingwine et al. |
| 6,886,162 B1 | 4/2005 | McKenney |
| 7,349,926 B2 | 3/2008 | McKenney et al. |
| 8,028,282 B2 | 9/2011 | Brannock et al. |
| 9,507,843 B1 | 11/2016 | Madhavarapu et al. |
| 2008/0059894 A1* | 3/2008 | Cisler ................. G06F 11/1469 715/762 |
| 2009/0271412 A1* | 10/2009 | Lacapra ................ H04L 67/104 |
| 2011/0016181 A1* | 1/2011 | Malik ............... G11B 20/00362 709/206 |
| 2012/0030513 A1* | 2/2012 | Peng ................... G06F 11/2097 714/37 |

(Continued)

FOREIGN PATENT DOCUMENTS

WO    2016122699 A1    8/2016

OTHER PUBLICATIONS

Michael, "Safe Memory Reclamation for Dynamic Lock-Free Objects Using Atomic Reads and Writes", PODC 2002 Jul. 21-24, 2002, Monterey California, USA, Copyright 2002 ACM, 10 pages.

(Continued)

*Primary Examiner* — Syling Yen
(74) *Attorney, Agent, or Firm* — Steven M. Bouknight (57) ABSTRACT

Updating a database is provided. The updating is noticeable by all read and/or write processes. In response to a write request to the database, a temporary copy of the database is generated. The write operations are performed to the temporary copy of the database. The current database generation of the database is replaced with the temporary copy for creating a next database generation.

14 Claims, 6 Drawing Sheets

(56) References Cited

U.S. PATENT DOCUMENTS

| | | | |
|---|---|---|---|
| 2012/0036329 A1 | 2/2012 | Coon et al. | |
| 2012/0239634 A1 | 9/2012 | Chen et al. | |
| 2015/0134602 A1 | 5/2015 | Nicholas et al. | |
| 2016/0179593 A1* | 6/2016 | Arimilli | G06F 9/546 |
| | | | 719/314 |
| 2016/0253352 A1* | 9/2016 | Kluck | G06F 16/176 |
| | | | 707/638 |
| 2016/0299917 A1* | 10/2016 | Koos | G06F 16/178 |
| 2017/0116255 A1 | 4/2017 | Kim et al. | |
| 2017/0116334 A1* | 4/2017 | Kruglikov | G06F 16/21 |
| 2017/0193040 A1* | 7/2017 | Agrawal | G06F 16/22 |
| 2018/0011893 A1* | 1/2018 | Kimura | G06F 12/0238 |
| 2018/0203870 A1* | 7/2018 | Narayanasamy | G06F 16/13 |
| 2019/0087600 A1* | 3/2019 | Sion | G06F 21/62 |
| 2019/0108104 A1* | 4/2019 | Gupta | G06F 11/1471 |

OTHER PUBLICATIONS

Verma et al., "SQLean: Database Acceleration via Atomic File Update", Hewlett Packard Labs, HPL-2015-103, Copyright 2015 Hewlett Packard Enterprise Development LP, 4 pages.

\* cited by examiner

UPDATING A DATABASE

The present invention relates in general to data processing systems, in particular, to updating a database, wherein the updating is noticeable by all read and/or write processes, as well as to a computer program product for updating a database and a data processing system.

BACKGROUND

Multidimensional database computing environments enable companies to deliver critical business information to the right people when they need it. This includes the ability to leverage and integrate data from multiple existing data sources, and distribute filtered information to end-user communities in a format that best meets those users' needs. Users can interact with and explore data in real time, and along familiar business dimensions, enabling fast analytics.

In the prior art systems and methods are known for use with a multidimensional database computing environment. To improve performance, lock-less algorithms and data structures are implemented for the multidimensional database. The lock-less algorithms are implemented with specific hardware-level instructions so as to provide atomicity.

SUMMARY

A method is provided for updating a database, wherein the updating is noticeable by all read and/or write processes. The method comprises (i) in response to a write request to the database, generating a temporary copy of the database; (ii) performing write operations to the temporary copy of the database; and (iii) replacing the current database generation of the database with the temporary copy for creating a next database generation.

Embodiments of the invention describe a method for synchronized atomic updates on persistent storage media that can be used to implement a distributed database. Multiple generations of the database content may exist in parallel, different instances may have different but consistent views of the current content.

According to embodiments of the invention, files may be updated in an atomic manner, without the need to recover file content and with the ability for readers to retrieve the file content at any time.

Multiple programs or threads need to synchronize atomic updates on a data structure. Embodiments of the invention are advantageous compared to techniques like locking or read-copy-update which are commonly used as long as subject data structure is in a shared memory location.

Embodiments of the invention are also advantageous when updating a file content, where according to prior art filesystems do provide the ability to lock a file, in order to gain exclusive access and update a file.

According to embodiments of the invention readers may retrieve the database content while it is being updated. Further, situations can be avoided that a failure of the writer to unlock the file requires a recovery action that often needs a sideband communication channel, such as e.g. network sockets, to be performed.

Filesystems provide some atomic operations that either complete or have not happened to observers. Among these are atomic renaming of a file, and atomic creation of a hard-link to a file. Both operations together allow to replace a file in multiple steps, with an easy and atomic way out in case the updater fails to complete it.

Thus, advantageously, an atomic replacement operation may be used for replacing the current database generation with the temporary copy of the database.

As used herein an atomic operation is defined interruptible, but delivering distinct end states and avoiding intermediate states to occur. According to POSIX standard atomic operations are well defined in the state of the art.

Embodiments of the invention in particular may be used for small databases, where many read operations and/or fewer write and/or update operations occur.

Further, a favorable computer program product is proposed for updating a database, wherein the updating is noticeable by all read and/or write processes, the computer program product comprising a computer readable storage medium having program instructions embodied therewith, the program instructions executable by the computer system to cause the computer system to perform a method comprising: (i) in response to a write request to the database, generating a temporary copy of the database; (ii) performing write operations to the temporary copy of the database; and (iii) replacing the current database generation of the database with the temporary copy for creating a next database generation.

Further, a data processing system for execution of a data processing program is proposed, comprising computer readable program instructions for performing the method described above.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a method for updating a database, wherein the updating is noticeable by all read and/or write processes. The illustrative embodiments may be used for updating the database, comprising (i) in response to a write request to the database, generating a temporary copy of the database; (ii) performing write operations to the temporary copy of the database; and (iii) replacing the current database generation of the database with the temporary copy for creating a next database generation. The illustrative embodiments are sometimes described herein using particular technologies only as an example for the clarity of the description.

Figure 1:
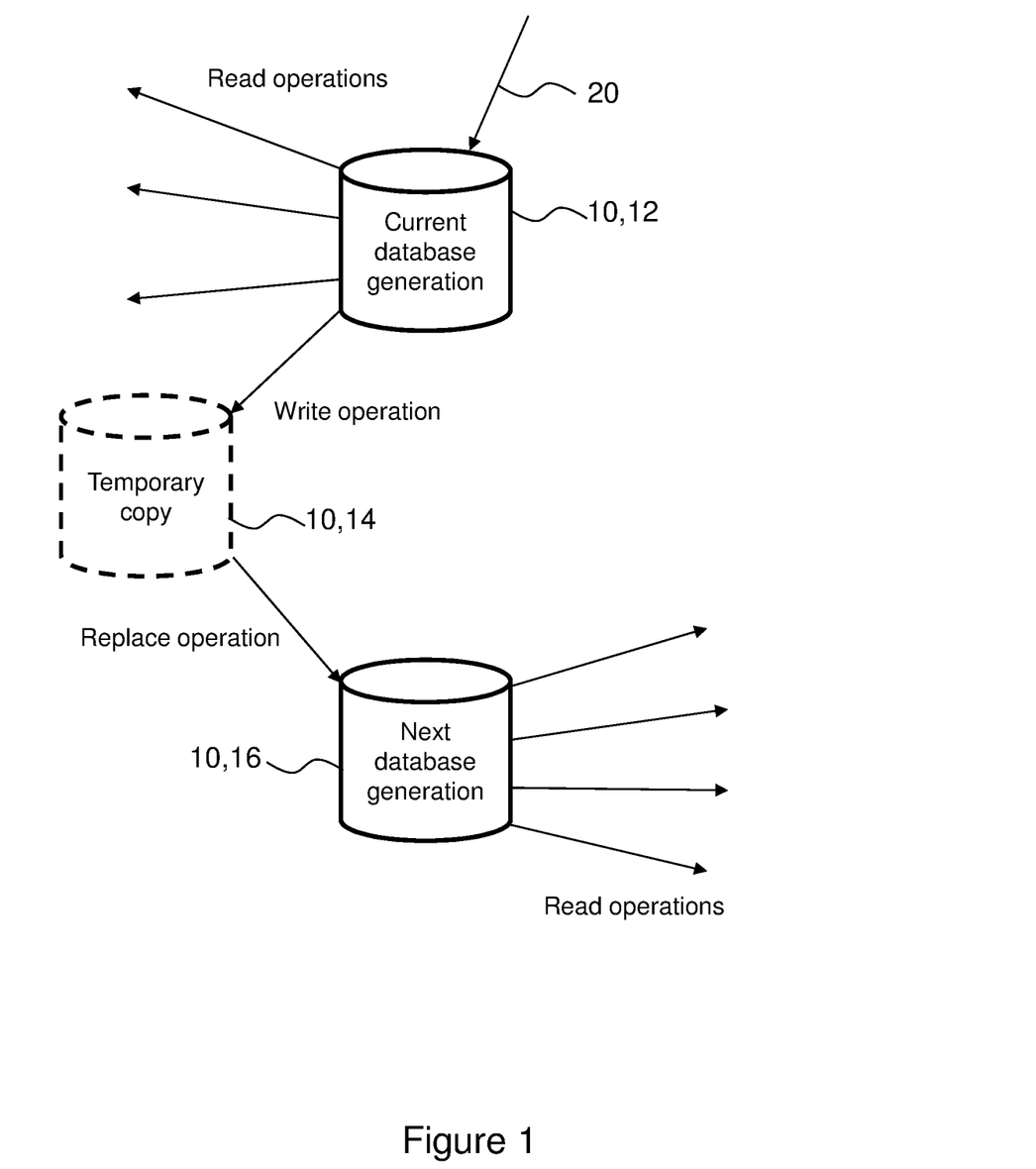
FIG. 1 depicts an overview of updating a database, wherein the updating is noticeable by all read and/or write processes, according to an embodiment of the invention.

FIG. 1 depicts an overview of updating a database 10, wherein the updating is noticeable by all read and/or write processes, according to an embodiment of the invention.

The inventive method comprises (i) in response to a write request 20 to the database 10, generating a temporary copy 14 of the database 10; (ii) performing write operations to the temporary copy 14 of the database 10; and (iii) replacing the current database generation 12 of the database 10 with the temporary copy 14 for creating a next generation database 16.

The database 10 may be implemented as a distributed database 10.

An updater may open a file descriptor to the current generation 12 of the database file 10, where the version information may be encoded in its filename. If the current database generation file 12 is renamed or removed while parsing is in progress, parsing still completes because the current generation file 12 will only be removed once no open file descriptors and no filenames exist for it.

The updater now modifies the content in-memory and writes the understanding of the next database generation to a temporary file 14. The filename of the next iteration is known. The current version number, incremented by one, may be encoded in the file name. The updater now tries an atomic rename operation of the old file 12 to an intermediate filename that does include the version number as well. If this operation fails, the updater has lost an update-race and has to go back to the previous step, and re-read the file content of the current generation 12. If the update succeeds, there is an intermediate state that can be recovered after a reasonable delay by a second updater by renaming the temporary file name to the next version file name, which blocks the current updater. The current updater then needs to re-read the content from the beginning in order to retry its update.

The current updater may now rename the temporary file 14 in a replace operation to become the new database generation 16.

Wrapping sequence numbers for identifying different database generations 12, 16 of the database 10 may be used. Alternatively other implementations to identify different database generations 12, 16 may also be used, e.g. comprising time stamps or the like.

Readers may parse the latest version at any time, either by the intermediate or final file name of it.

The current database generation 12 of the database 10 may be defined as existing in case a file descriptor and/or a link to the database 10 already exists in a computer system 212 according to e.g. POSIX inode behaviour of lifetime ending.

The updating process of the database 10 may be performed as a synchronized process, as the updating is noticeable by all read and/or write processes.

According to the inventive method an atomic replacement operation may be used for replacing the current database generation 12 with the temporary copy 14 of the database 10. Using atomic file operations, no sideband communication and no locking is needed to synchronize operation.

The current database generation 12 and the temporary copy 14 of the database 10 may be stored as different files in a filesystem and the atomic replacement operation may advantageously be an atomic rename of the respective files.

A directory may be moved or created on generating the temporary copy 14 of the database 10.

A write operation on the temporary copy 14 may be completed before replacing the current database generation 12 of the database 10 with the temporary copy 14.

Further, a write operation to the temporary copy 14 may be performed while performing a read operation on the current database generation 12 of the database 10.

Figure 2:
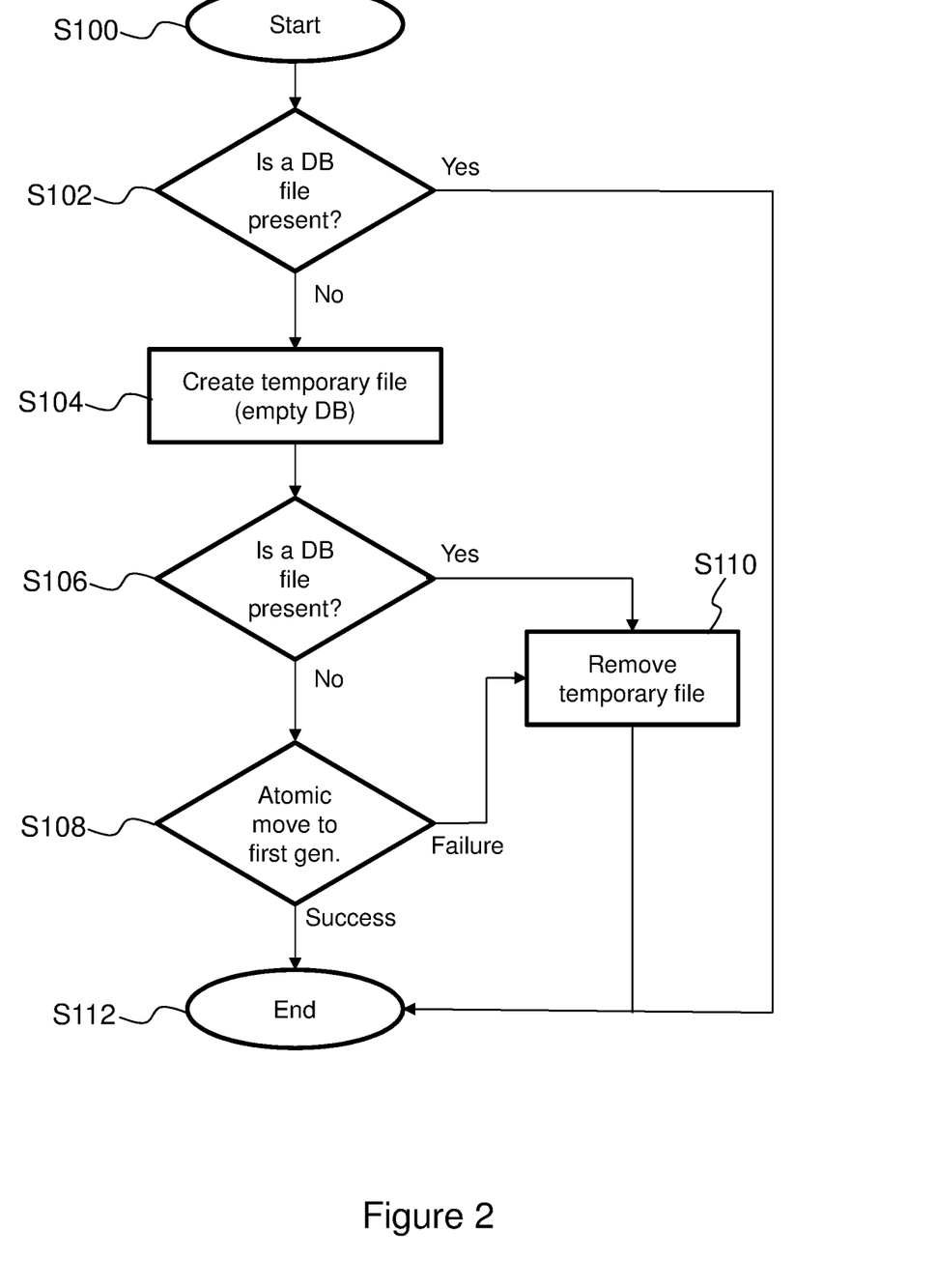
FIG. 2 depicts a flow chart for an initial file creation according to an embodiment of the invention.

FIG. 2 depicts a flow chart for an initial file creation according to an embodiment of the invention.

Upon starting the sub-process in step S100, there is a check performed in step S102, if a database file is present. If this is the case the process is ended with step S112. If not, then a temporary file is created in step S104 in an empty database. A next check is performed in step S106, if a database file is present. If this is the case, the temporary file is removed in step S110. If this is not the case, there is an atomic move performed to a first database generation in step S108, before ending the sub-process in step S112, if the atomic move process is successful. In case of a failure of the atomic move process in step S108 then the temporary file is removed in step S110.

Figure 3:
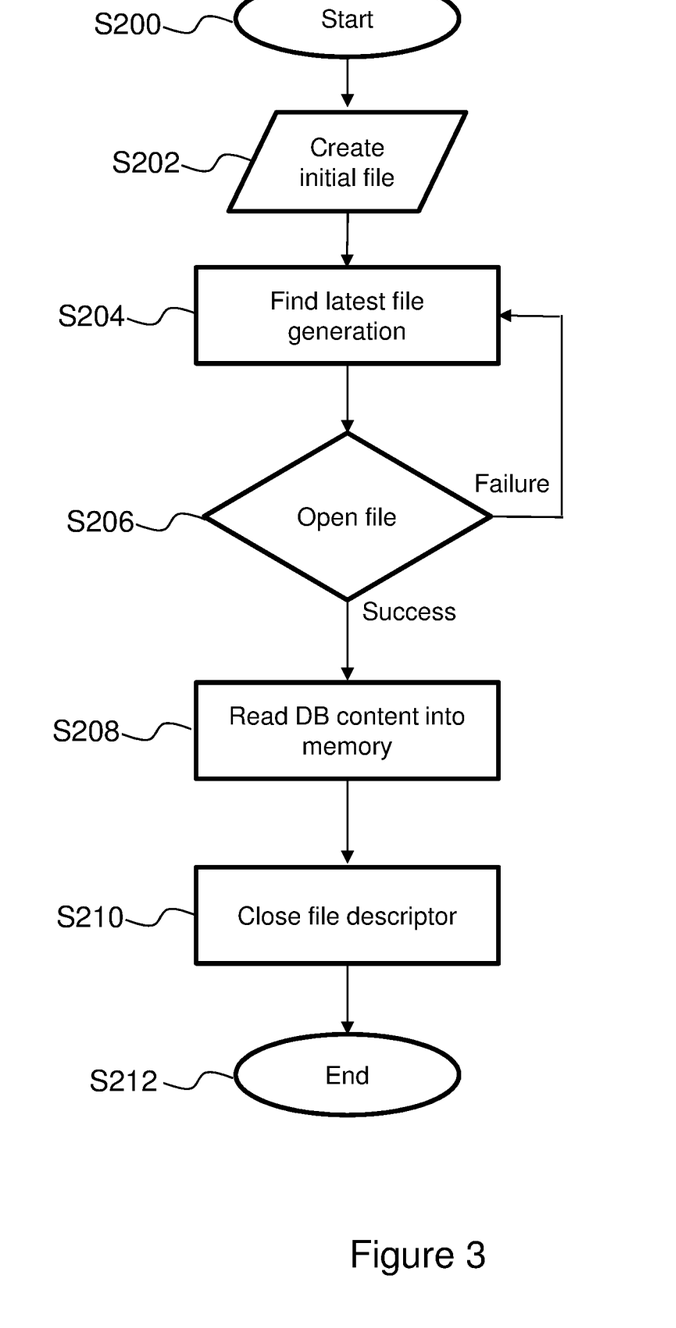
FIG. 3 depicts a flow chart for loading a database content according to an embodiment of the invention.

FIG. 3 depicts a flow chart for loading a database content according to an embodiment of the invention.

Upon starting the sub-process in step S200, there is an initial file created in step S202, as e.g. described by the flow chart in FIG. 2. Next the latest file generation is searched in step S204 and if found, the file is opened in step S206. In case of a failure during the open operation, the search for the latest file generation in step S204 is repeated. If the open operation is successful the database content from the file is read into memory in step S208. In step S210 the file descriptor is closed and the sub-process is ended in step S212.

Figure 4:
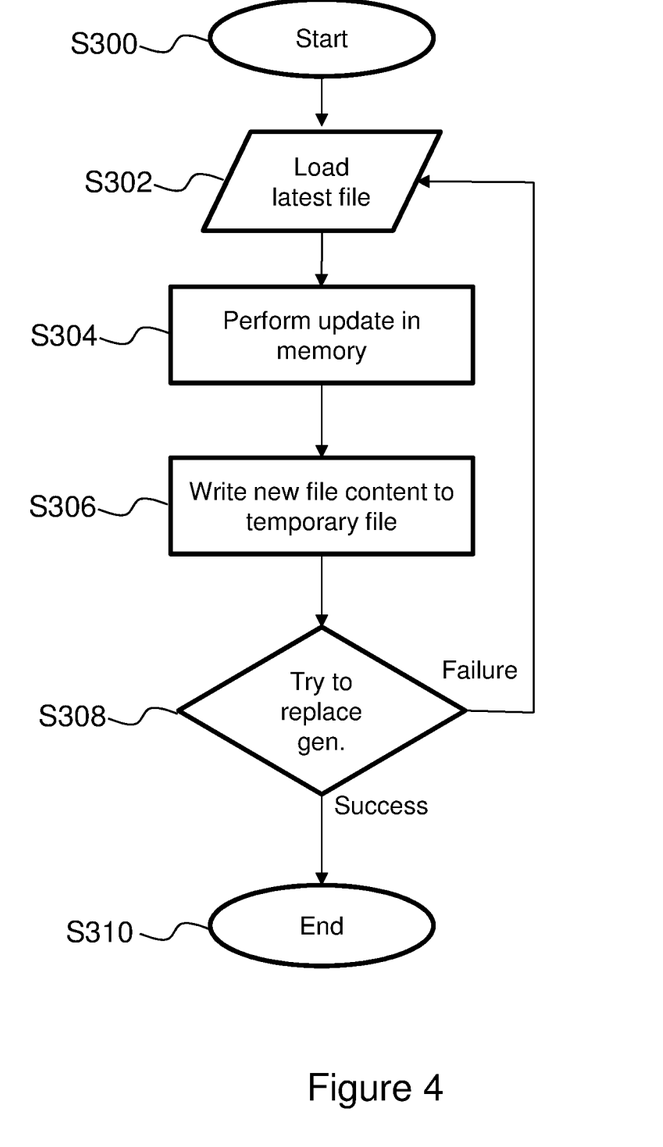
FIG. 4 depicts a flow chart for updating a database according to an embodiment of the invention.

FIG. 4 depicts a flow chart for updating a database 10 according to an embodiment of the invention.

Performing write operations to the temporary copy 12 of the database 10 may comprise loading a latest file of the current database generation 12, performing an update operation in a memory of the computer system 212, and writing new file content to the temporary copy 14.

Therefore upon starting the sub-process in step S300, the latest file is loaded in step S302, according to the sub-process for loading a database content as described in FIG. 3. Next an update of the latest file is performed in the memory in step S304. The new file content is written to a temporary file in step S306. Then in step S308 it is tried to replace the current database generation. In case of a failure the process is repeated starting from step S302 with loading the latest file again. If the replace operation is successful the sub-process is ended.

Figure 5:
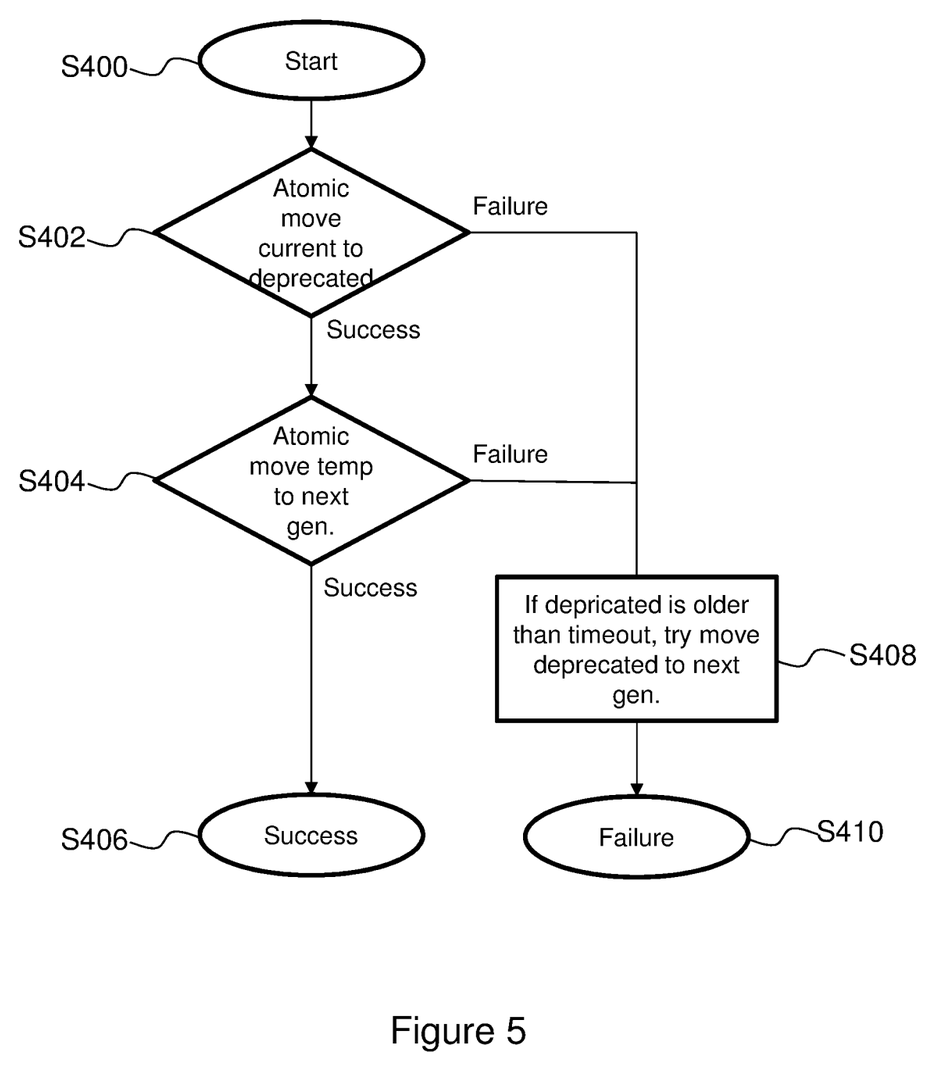
FIG. 5 depicts a flow chart for replacing a database generation according to an embodiment of the invention.

FIG. 5 depicts a flow chart for replacing a database generation according to an embodiment of the invention.

Replacing the current database generation 12 of the database 10 with the temporary copy 14 may comprise moving the current database generation 12 to a deprecated database generation by an atomic operation and moving the temporary copy 14 to a next database generation 16 of the database 10 by an atomic operation. A deprecated database generation may be understood as an inactive database generation which yet can be read. In case the deprecated database generation is older than a timeout, the deprecated database generation may be moved to the next database generation 16 of the database 10.

Therefore upon starting the sub-process in step S400, an atomic move of the current database generation 12 to a deprecated version of the database 10 is performed in step S402. If the move operation is successful, in step S404 the temporary generation 14 is moved to the next generation 16 and the sub-process is successfully ended in step S406.

If the first move in step S402 is not successful there is the operation in step S408 is performed. If the deprecated version of the database 10 is older than a timeout, it is tried to move the deprecated version to the next generation 16 and the sub-process is ended with a failure. The same step S408 is performed, if the atomic move in step S404 is not successful.

Figure 6:
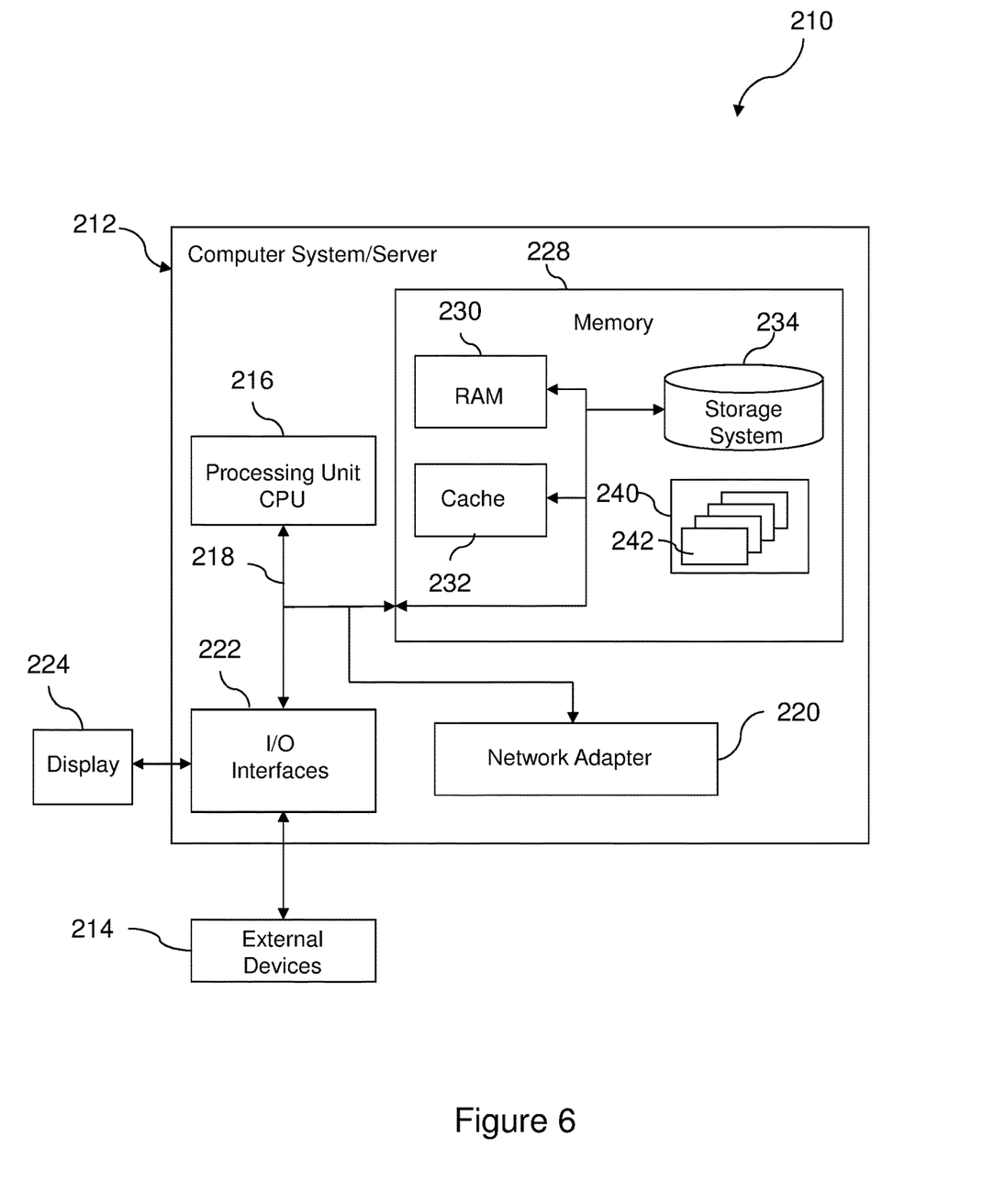
FIG. 6 depicts an example embodiment of a data processing system for executing a method according to the invention.

Referring now to FIG. 6, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for updating a multidimensional database, the method comprising:
    based on there being an existing database file, finding a current generation of the database file that comprises a first version number encoded in a filename associated with the current generation;
    opening a file descriptor associated with the current generation of the database file;
    based on successful opening of the file descriptor, reading contents of the current generation of the database file associated with the file descriptor into a memory copy, and closing the file descriptor;

updating the memory copy;

writing the memory copy to a new temporary copy of the database;

requesting to perform an update operation on the current generation of the database file, wherein the update operation comprises modifying file content associated with the memory copy of the current generation of the database file, writing the modified file content to the new temporary copy, and performing a renaming operation on the new temporary copy to create a next generation of the database file determining whether the update operation is successful based on the renaming operation, and in response to a failed renaming operation, performing a re-read operation of the file content associated with the current generation of the database file to retry the update operation;

in response to a successful request and update operation, performing the renaming operation by encoding the new temporary copy with the filename including a second version number that is incrementally based on the first version number, and enabling a second update operation to be performed on the new temporary copy while preventing other current updates from being performed; and performing a replacement operation to replace the current generation of the database file with the next generation of the database file based on the encoded new temporary copy.

2. The method according to claim 1, further comprising: using an atomic replacement operation for replacing the current database generation with the temporary copy of the database.

3. The method according to claim 1, further comprising: a directory being moved on generating the temporary copy of the database.

4. The method according to claim 1, further comprising: a directory being created on generating the temporary copy of the database.

5. The method according to claim 1, further comprising: completing a write operation to the temporary copy before replacing the current database generation of the database with the temporary copy.

6. The method according to claim 1, further comprising: performing a write operation to the temporary copy while substantially concurrently performing a read operation on the current database generation of the database.

7. The method according to claim 1, further comprising: identifying different database generations of the database by timestamps.

8. The method according to claim 1, further comprising: the database being implemented as a distributed multidimensional database.

9. The method according to claim 1, further comprising: the current database generation of the database being defined as existing in case a file descriptor and/or a link to the database already exists in a computer system.

10. The method according to claim 1, wherein performing the replacement operation to replace the current generation of the database file with the next generation of the database file further comprises:

writing the updated memory copy to the temporary file;

moving the current database generation to a deprecated database generation, wherein the deprecated generation is an inactive database generation which can be read;

moving a temporary file to a next database generation, including a next generation number, based on the successful moving to the deprecated database generation; and moving the deprecated database generation to the next database generation, based on the unsuccessful moving of the current database generation to the deprecated database generation.

11. A computer program product for updating a multidimensional database, comprising:

a computer readable storage medium readable by a processing circuit and having program instructions embodied therewith, the program instructions executable by a processor to cause the processor to perform a method comprising:

based on there being an existing database file, finding a current generation of the database file that comprises a first version number encoded in a filename associated with the current generation;

opening a file descriptor associated with the current generation of the database file;

based on successful opening of the file descriptor, reading contents of the database file associated with the file descriptor into a memory copy, and closing the file descriptor;

applying updates to the memory copy;

writing the memory copy to a new temporary copy of the database;

requesting to perform an update operation on the current generation of the database file, wherein the update operation comprises modifying file content associated with the memory copy of the current generation of the database file, writing the modified file content to the new temporary copy, and performing a renaming operation on the new temporary copy to create a next generation of the database file determining whether the update operation is successful based on the renaming operation, and in response to a failed renaming operation, performing a re-read operation of the file content associated with the current generation of the database file to retry the update operation;

in response to a successful request and update operation, performing the renaming operation by encoding the new temporary copy with the filename including a second version number that is incrementally based on the first version number, and enabling a second update operation to be performed on the new temporary copy while preventing other current updates from being performed; and performing a replacement operation to replace the current generation of the database file with the next generation of the database file based on the encoded new temporary copy.

12. The computer program product according to claim 11, further comprising: using an atomic replacement operation for replacing the current database generation with the temporary copy of the database.

13. A system for execution of a data processing program comprising:

a computer readable storage device having program instructions embodied therewith, wherein the computer readable storage medium is not a transitory signal per se, the program instructions executable by a processor to cause the processor to perform a method comprising:

in response to a write request to the database, generating a temporary copy of the database;

performing write operations to the temporary copy of the database; and replacing the current database generation of the database with the temporary copy for creating a next database generation, wherein replacing the current database generation comprises, requesting to perform an update operation on the current generation of the database file, wherein the update operation comprises modifying file content associated with the memory copy of the current generation of the database file, writing the modified file content to the new temporary copy, and performing a renaming operation on the new temporary copy to create a next generation of the database file determining whether the update operation is successful based on the renaming operation, and in response to a failed renaming operation, performing a re-read operation of the file content associated with the current generation of the database file to retry the update operation;

in response to a successful request and update operation, performing the renaming operation by encoding the new temporary copy with the filename including a second version number that is incrementally based on the first version number, and enabling a second update operation to be performed on the new temporary copy while preventing other current updates from being performed; and performing a replacement operation to replace the current generation of the database file with the next generation of the database file based on the encoded new temporary copy.

14. The system according to claim 13, further comprising:

a directory being moved on generating the temporary copy of the database; and a directory being created on generating the temporary copy of the database using wrapping sequence numbers for identifying different database generations of the database, wherein the database is implemented as a distributed database.

* * * * *